April 8, 1952     R. E. SOUTHER, JR     2,591,737
DETECTION OF OIL IN MUD-LADEN WELL DRILLING FLUIDS
Filed Nov. 28, 1950
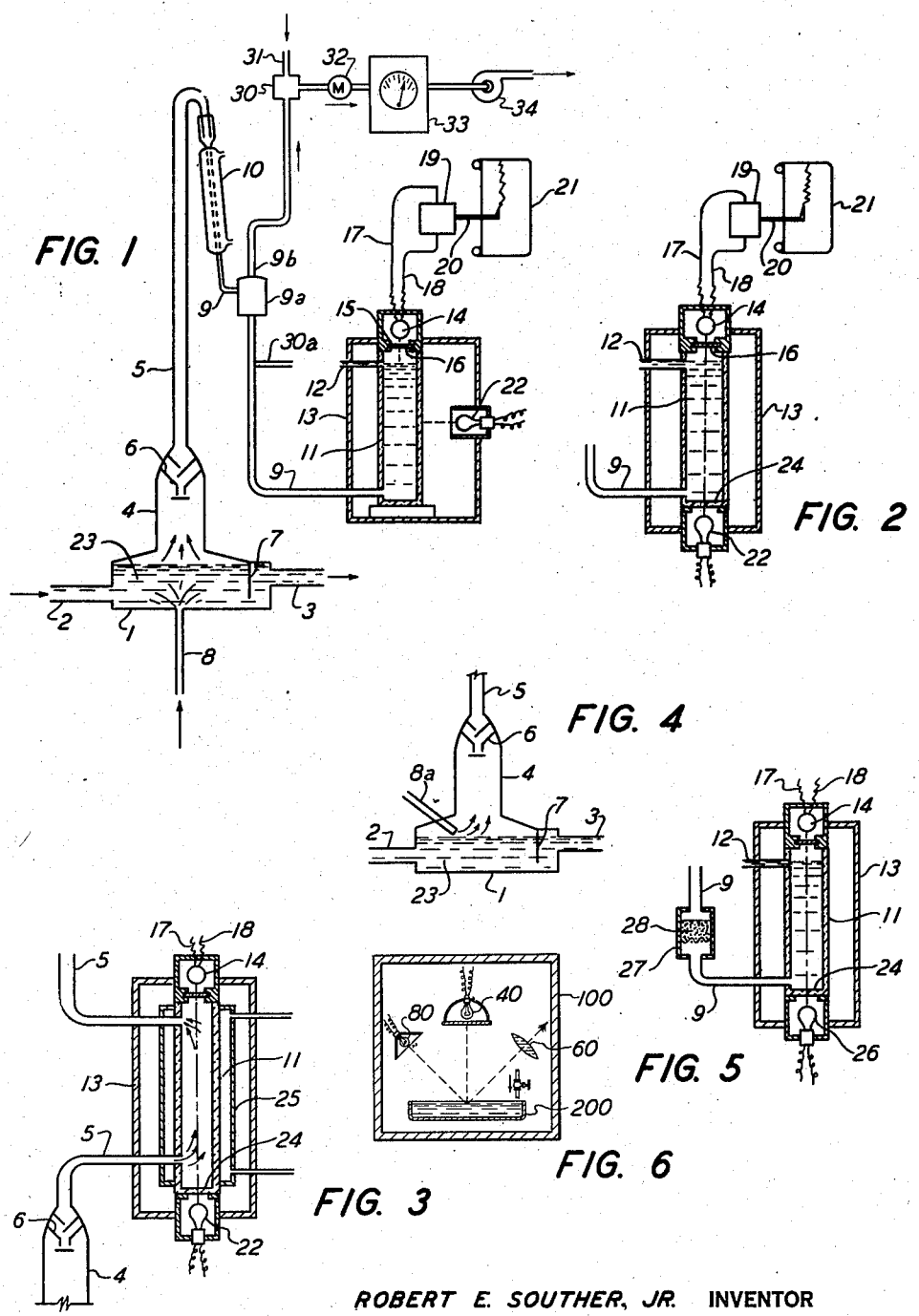
ROBERT E. SOUTHER, JR. INVENTOR
BY
ATTORNEY ately Apr. 8, 1952

2,591,737

UNITED STATES PATENT OFFICE 2,591,737

DETECTION OF OIL IN MUD-LADEN WELL DRILLING FLUIDS

Robert E. Souther, Jr., Houston, Tex., assignor to National Lead Company, Los Angeles, Calif., a corporation of New Jersey Application November 28, 1950, Serial No. 197,981

18 Claims. (Cl. 250—71)

This invention relates to methods and apparatus for the detection of crude oil in drilling muds, i. e., mud-laden fluids such as are normally employed in the rotary drilling of oil and gas wells. This application was co-pending with and is a continuation-in-part of a parent application Serial No. 442,871, filed May 13, 1942, now abandoned.

In accordance with conventional rotary drilling practice, a well-drilling fluid, also called "a mud fluid," or "mud-laden fluid," consisting generally of a suspension of clay solids in water, is circulated through the well for the various purposes well known to the drilling art. The drilling rig comprises generally a drill pipe having an enlarged bit at its lower end provided with eyes and this drill pipe with its bit is rotated while it is let down to make the hole. A drilling fluid is pumped down the drill pipe, issues through the holes in the bit and passes upwardly in the annular space around the pipe and to the surface, and hence it passes through a settling ditch or over a screen where the cuttings are separated. The drilling fluid then picked up a pump for recirculation. Normally, the head of the drilling fluid column is maintained in excess of the pressures of any formations traversed by the drill by the addition to the fluid of a suitable clay and in some cases by the addition of weighting materials such as barytes, iron oxide, and the like. A gel-component such as bentonite is normally added to improve the wall-sealing and plastering properties of the fluid. The resulting drilling fluid is normally a viscous fluid of about the consistency of lubricating oil. When such a fluid is employed in drilling and an oil-bearing stratum is pierced by the drill, the excess head of the drilling fluid column and its sealing properties will act to seal such stratum and prevent the inflow of oil into the well bore and into the column of drilling fluid from the surrounding stratum.

Under modern conventional rotary drilling practice using mud fluids of the above-described character, and with the head of the fluid column maintained in excess of the pressures in the traversed formations, only a very small quantity of oil contained in the comparatively small core or cylinder of the stratum drilled out by the bit, as distinguished from the fluids in the surrounding strata, will become dilutedly dispersed in the upwardly rising column of drilling fluid by the action of the drill bit. Some of the oil will, however, be retained by the cuttings which are separated from the drilling fluid, either by deposit in the settling ditch or by the screen, in order to enable the fluid to be recirculated. The fluid or the cuttings, or both, may then by suitable methods of analysis, be detected in the drilling fluid returns at the top of the well. However, the problem of detection of oil in such drilling fluid is greatly complicated by the fact that it is normally present in extremely dilute dispersions in the fluid and, therefore, in normally unobservable quantities. Since as much as 100 barrels of fluid may normally be circulated through the well for each lineal foot of formation traversed by the drill, the quantity of oil present in the drilling fluid returns at the top of the well is generally of an order of substantially less than 100 parts per million, even in the case of a comparatively rich oil sand, and in many cases, only as little as 15 or 20 parts per million of oil is present in the fluid and cuttings. These very minute amounts of oil are ordinarily completely invisible in the fluid and special detection methods are therefore required to determine the presence of oil in the fluid and cuttings.

Among the methods heretofore used for detection of oil in the drilling fluid and in the cuttings, was a method of subjecting the surfaces of fluid and cuttings samples to ultraviolet light which produces fluorescence of the otherwise invisible oil particles and renders them visible by their fluorescence. However, detection by means of ultra-violet light is sometimes rendered uncertain because of the frequent presence in the fluid and even in the cuttings of particles or droplets of lubricating oils and greases employed in lubricating the drilling tools and machinery around the rig. These materials also fluoresce under ultraviolet light and when present, often in greater amount than the crude oil, are likely to produce false oil shows in the fluid and in the cuttings and thus render this method of detection inaccurate and uncertain.

Another method suggested has been to heat the drilling fluid to vaporize oil present in the drilling fluid and to conduct the resulting hydrocarbon vapors with air to a combustion chamber having a spark plug and a thermo-couple to indicate the burning of the gas-air mixture. That method is, however, limited to those cases where the percentage of gas is that necessary to produce a combustible mixture, which requires at least 5% of gas, even where the gas is dry, as distinguished from gas containing water vapor resulting from vaporization of water from the drilling fluid along with oil, which raises the minimum percentage above 5%. Such a percentage is much below that obtainable from a drilling fluid under the conditions of drilling heretofore described. If it be attempted to detect the small percentage of oil in a drilling fluid, so vaporized, by the use of a more or less conventional hot filament gas detector, then further difficulties are encountered because of the fact that the presence of water vapor with the oil vapor will render the detector ineffective. The above methods are furthermore not satisfactory, because of the practical difficulties which accompany the direct heating of drilling fluid and also because the method cannot distinguish satisfactorily between light hydrocarbon gases and crude oil vapors, nor between crude oil and lubricating oils.

The present invention has for its principal objects the detection of oil in drilling fluids or in cuttings from such fluids, by a method which avoids the difficulties of the above methods, as noted above, and which provides a rapid and simple method, which may even be conducted continuously, and which enables the operator to readily detect indications of fresh crude oil in the fluid or cuttings with reduced danger of interference from lubricating oil.

Generally stated, in accordance with illustrative embodiments of this invention, the method comprises subjecting the drilling fluid, or the cuttings from such a fluid, to distillation with steam and subjecting the resultant of such distillation to a selective visual inspection for the presence of crude oil fractions. The medium inspected may either be the vapor or condensate of such vapor. The selective visual inspection may be any suitable one, such as direct inspection of an oil film on the water of the condensate or of the presence of an oil-water emulsion, or of the dying of the oil film or emulsion by a suitable dye, or by observing the light absorption of the vapor or of the condensate, or by subjecting the vapor or condensate to ultra-violet light.

In accordance with an illustrative embodiment of this invention, drilling fluid, coming from the well during drilling, or the cuttings therefrom, is subjected to distillation, as with a current of steam to thereby vaporize crude oil in admixture with water vapor from the drilling fluid or from the cuttings. Where the fluid is so treated, it is subjected to steam without preliminary preparation, although the fluid may be diluted with water. Where the cuttings are so treated, they are preferably washed with water to eliminate the clay which may adhere thereto. The resulting vapor or vaporized mixture is then tested in a variety of ways as described, either in the vaporous or condensed state, for the presence of crude oil.

It is found that when drilling fluid, or the cuttings, containing the relatively minute quantities of crude oil normally invisibly dispersed therein, is subjected to steam distillation with, for example, saturated steam at substantially atmospheric pressure, a substantial portion of the crude oil in the drilling fluid, or cuttings, will be distilled over and will be present in the vapor mixture resulting from the distillation. The resulting vaporized mixture is then tested in various ways for the presence of crude oil.

One method of testing for crude oil, comprises condensing the vaporized mixture and permitting the distilled oil to stratify on the surface of the aqueous condensate where it may be visible to the naked eye as a layer or film, or may be detected by suitable viewing apparatus. Or the condensate may be shaken, and if it contains oil, an emulsion will be observed. Or the film or the emulsion may have added to it a suitable oil dye and observed. Or the condensate may be subjected to a light beam and light adsorption observed by a suitable light meter. Or the distillate or vaporous mixture may be inspected with rays from the ultra-violet or other suitable portion of the spectrum to which the oil will react in a characteristic manner.

As an example, ultra-violet rays may be passed through the vapor mixture or through the condensate and the resulting absorption of energy from the rays is measured as an indication of the presence of oil. Or the condensate may contain the oil in the form of minute, widely dispersed, and normally invisible droplets, and may be irradiated with ultra-violet light whereby the oil droplets will fluoresce in a characteristic manner and be rendered visible thereby. In still another embodiment, the distillate may be condensed in a normally non-fluorescent solvent for the oil and the resulting solution tested for fluorescence or absorption of ultra-violet or other ray energy to indicate the presence of oil in the distillate. In a further embodiment, a suitable oil-soluble dye may be intimately mixed with aqueous distillate. Such dye will be dissoved in or absorbed by the dropets of oil, which will be rendered more sharply visible thereby either to the eye or to a suitable viewing device.

With the described method of steam distillation only a negligible proportion of any lubricating oil or grease, if present in the mud, will be likely to distill over, because of its extremely low vapor pressure under the distillation conditions, as compared with the vapor pressure of crude oil, which will be many times as great as that of the ordinary lubricating oil or grease. The danger of false "oil shows" due to the presence of lubricating oil in the mud is, therefore, greatly reduced by the method of this invention.

It is further found that those components of crude oil boiling below about 350° F., which include most of the components of natural gas and natural gasoline, do not readily fluoresce or absorb energy from ultra-violet rays. This method, therefore, provides means for distinguishing additionally between crude oil and the components of natural gas or gasoline which may be present in the fluid or the cuttings. By, therefore, subjecting the fluid or the cuttings to distillation with steam at a temperature not in excess of 350° F. distillation will be limited to those fractions. Moreover, this avoids distillation of any lubricating oil which may be present in the drilling fluid, and so will avoid a false show.

The steam distillation method, in accordance with this invention, lends itself very successfully to the continuous inspection of the mud stream flowing continuously from a well during drilling and is thereby especially adapted for continuous logging of wells during drilling, as for example, in the logging method described in John T. Hayward U. S. Patent No. 2,214,674, September 10, 1940. For this purpose a portion of the drilling fluid leaving the well as caused to flow continuously through the distillation apparatus and is continuously distilled therein and the products subjected continuously to inspection by a suitable method of inspection, examples of which are mentioned above, and are described in detail hereinafter. By maintaining substantially constant and uniform distillation and inspection conditions, the presence of crude oil will be detected in a continuous manner, and it is found generally that the magnitude of the inspection results will depend upon the quantity of crude oil in the drilling fluid. Thus, as the concentration of oil in each increment of the fluid changes, a corresponding quantitative change in the inspection results will be obtained by the use of a suitable detection method or apparatus which is responsive to such changes.

Additional and more specific objects and advantages of this invention will become apparent from the following detailed description when read in conjunction with the accompanying drawings which illustrate several forms of apparatus adapted for successfully practicing several embodiments of this invention.

In the drawings:

Fig. 1 illustrates schematically one embodiment of an apparatus in accordance with this invention;

Fig. 2 is a detail view of another embodiment of the oil detecting means in accordance with this invention;

Fig. 3 illustrates still another embodiment of the oil detecting means in accordance with this invention;

Fig. 4 illustrates a modified form of steam distillation apparatus in accordance with this invention;

Fig. 5 illustrates a further embodiment of the oil detection method in accordance with this invention; and Fig. 6 is an illustration of a simplified embodiment of this invention.

The method embodying this invention is not restricted to any particular apparatus, but may be indeed carried out by elemental means, comprising: a closed flask containing water and heated with a burner; a tube leading from the top of the first flask to the bottom of another closed flask, containing the sample of drilling fluid or cuttings, and directing the steam from the first flask onto the fluid or the cuttings; and a tube from the top of the first flask to a condenser. The condensate issuing from the condenser may then be collected in a test tube.

With the distillation temperature not in excess of 350° F. the test for crude oil in the sample will be simple. If the sample contains lubricating oil only, water only will issue from the condenser. If the sample contains crude oil it will show as a film on top of the water in the test tube, which film is readily observable, but may be made more distinct by an oil coloring dye. By shaking the test tube, if the sample contains crude oil, an oil-water emulsion will be formed which may be observed directly; or it may be colored by a dye and observed; or it may be subjected to a light beam to determine selective absorption; or it may be subjected to ultra-voilet light. There will be no showing by any of the tests if the sample contains no crude oil, except that light absorption will be less than where the sample contains crude oil. The above elemental means is elaborated in the apparatus now to be described and shown in the drawings.

Referring to the drawings and Fig. 1 in particular, the numeral 1 designates a still constructed of glass or metal having an inlet conduit 2 communicating with one end, and an outlet conduit 3 communicating with the opposite end. The still is fitted with a vapor dome 4 to which is connected a vapor line 5. Vapor dome 4 is fitted internally with baffles 6 to prevent carry-over of liquid from the still. A baffle plate 7 extends vertically from the top of the still toward the bottom and is arranged adjacent the outlet end of the still to maintain a liquid seal between the inlet and outlet of the still. A pipe 8, connects into the bottom of the still beneath the vapor dome. Still 1 is of more or less conventional construction and other suitable forms may be substituted therefor, since its constructional details form no part of this invention.

Vapor line 5 communicates with a condenser tube 9 which is provided with a jacket 10 through which a suitable cooling fluid may be circulated. Any other conventional or suitable form of vapor condenser may be employed in place of the form shown, which is intended to be schematic for purposes of illustration. Condenser tube 9 communicates with the lower end of a cylindrical condensate receiver 11, open at its upper end and having an overflow pipe 12 communicating with the side of receiver 11 adjacent its upper end. Condensate receiver 11 is preferably constructed of "Pyrex" glass or other transparent material which will readily transmit ultra-violet light.

Receiver 11 is arranged in upright position within a dark box 13 or other light-excluding housing. Mounted in the top of box 13 above the top of receiver 11 is a phototube 14, of any suitable or conventional form having a scanning slit 15 arranged to receive light transmitted from the interior of receiver 11. Slit 15 is provided with filter 16 adapted to exclude from phototube 14 light of undesired wave-lengths. Phototube 14 may be of any suitable type. For instance it may be of the photovoltaic type such as a copper oxide, silver or selenium cell which requires no auxiliary source of potential, and gives voltage variations responsive to the amount of light received which can be recorded directly or after amplification. Phototube 14 is connected by means of conductor leads 17 and 18 to any suitable or conventional form of recorder 19, having a pen arm 20 cooperating with a moving recording medium 21 to provide the desired record of variations of the intensity of the light received by the phototube.

Mounted in a side of box 13 is a light source 22 arranged to direct its rays on the side of receiver 11, preferably at right angles thereto. Light source 22 may be of any suitable form adapted to generate light rays of the desired wave-lengths. For example, the light source may be a conventional mercury-vapor lamp adapted to supply ultra-violet light, or it may be an ordinary incandescent lamp adapted to supply the visible light employed in one embodiment in accordance with this invention.

The apparatus illustrated in Figure 1 and described above is employed in the following manner for the detection of crude oil in drilling mud: A small stream of drilling fluid 23, diverted from the main stream flowing from the top of a well (not shown), is caused to flow continuously at a constant rate, through still 1 from inlet 2 to outlet 3, from which the fluid is discharged to a mud pit (not shown) or to waste. Steam, preferably saturated steam, at or slightly above atmospheric pressure, is introduced through pipe 8 into the bottom of still 1 and passes through the body of mud fluid, the steam contacts the minute and dilutedly dispersed oil droplets contained in the mud fluid and vaporizes a portion thereof. The resulting mixture of steam and oil vapor flows upwardly through vapor dome 4 contacting baffles 6 which knock back any mud particles carried by the vapor mass. The vapor mixture, freed of entrained mud particles flows through vapor line 5, thence through condenser tube 9, wherein the vapor mixture is condensed by circulating cold water or other suitable cooling fluid through jacket 10. The resulting condensate flow from condenser tube 9 into the bottom of receiver 11. When the receiver has once been filled to the level of over-flow pipe 12, the condensate will continuously overflow therefrom and will be discharged to waste.

Separation of uncondensed gas from the condensate may be affected in advance of receiver 11 by interposing in the condenser tube 9 a gas trap 9a fitted with a gas-discharge pipe 9b. Tests for gas may be applied to the effluent from discharge pipe 9b. This may be secured by passing the gas to a mixing chamber 30, provided with an air intake 31; hence through a meter 32 to a gas detector 33, provided with an indicator and a recorder; the gas being drawn through the apparatus by an exhaust pump 34.

If the drilling fluid contained crude oil, the body of condensate accumulating in receiver 11 will contain crude oil fractions which will be present in the aqueous condensate in the form of widely dispersed droplets. Where the quantity of the crude oil in the mud fluid was relatively large, the quantity of oil droplets in the condensate will be sufficient to collect on the surface of the water in receiver 11 as a film or layer which will be visible to the eye or to a suitable viewing cell. In other cases, the oil droplets will remain dispersed in the aqueous condensate and form an oil-water emulsion, particularly since the condensate has been agitated in passing through the gas trap 9a. The condensate emulsion may be directly observed by permitting it to overflow from 12 into a test tube. The condensate emulsion may, however, be flooded with ultra-violet rays directed against the side of receiver 11 from ray source 22, which in this case will be a mercury vapor lamp or other suitable source of ultra-violet light. The oil globules in the condensate emulsion will absorb energy from the ultra-violet rays and will fluoresce in a characteristic manner.

The resulting fluorescent light from the condensate in receiver 11 will be received by phototube 14, filter 16 being of a character to transmit substantially only the fluorescent light to the phototube, and a measure of the intensity of the fluorescence will be transmitted to recorder 19, and a record thereof will be impressed on the recording medium 21 by pen 20.

The intensity of fluorescence of the condensate will vary in accordance with the concentration of crude oil in the mud passing through still 1. By maintaining a constant rate of steam distillation in still 1, as the mud fluid flows continuously therethrough, the variations in intensity of fluorescence of the resulting distillate, as recorded on recording medium 21, will provide a continuous record of the presence of crude oil in the mud fluid and of its relative concentration in successive portions of the continuously flowing stream of mud fluid. By suitably correlating the oil detection record with the successive portions of the drilling fluid as related to the depth of the well from which these portions received the drilled material, the record will provide an accurate log of the oil-containing strata encountered by the drill bit.

While it is found that saturated steam at or near atmospheric pressure, is particularly satisfactory for the purpose of this invention, steam at higher temperatures and pressures may be used successfully. It is only desirable that the temperature and pressures be such that no significant vaporization of lubricating oil or grease will occur.

A relatively wide range of temperatures and pressures for the steam distillation is thus available, since the vapor pressures of the lower fluorescent members of the various hydrocarbon series in crude oil are many times the vapor pressures of any of the fractions present in ordinary lubricating oils, and their partial pressures in the mud fluid will be greatly in excess of those of the lubricating oil components.

Also as noted previously, the gaseous and very light fractions of crude oil boiling below about 350° F. do not readily fluoresce to ultra-violet, thus, under the conditions of steam distillation, as above described, a positive reaction to ultra-violet rays will definitely indicate the presence of crude oil containing the lighter fractions in the drilling fluid, and the magnitude of the reaction will provide a measure of the concentration of oil in the fluid. A negative reaction will indicate the absence of crude oil containing those lighter fractions. Concurrent tests of the effluent from overflow pipe 12 or from gas discharge pipe 9b may be made to show the presence of gas, as distinguished from crude oil in the fluid, although tests for gas may be made independently of the oil tests.

Instead of measuring the intensity of fluorescence of the condensate, the absorption of ultra-violet light by the condensate may be measured. Measurement of the absorption of ultra-violet light may be found to be more sensitive and accurate in many cases, particularly in providing a more accurate index of the changing concentration of crude oil in different portions of the mud stream. Fig. 2 illustrates the oil detection unit of Fig. 1, having some of the parts thereof somewhat rearranged to measure the absorption of ultra-violet light by condensate. In this embodiment the source of ultra-violet light 22 is placed directly beneath the bottom 24 of receiver 11. Bottom 24 is preferably constructed of "Pyrex" glass or other material having high ultra-violet light transmitting properties. The rays from source 22 are directed vertically through the body of the condensate to the phototube 14 which, in this case, is of a form responsive to ultra-violet light and adapted to transmit a measure of the quantity received to recorder 19 for recording on the recording medium 21. In this case filter 16 is of a form adapted to transmit ultra-violet light to phototube 14 while excluding other portions of the spectrum therefrom.

Fig. 3 illustrates another embodiment of the oil detection unit in which the absorption of ultra-violet light by the vapor mixture from still 1 is measured, instead of measuring the absorption by the condensate or the fluorescence thereof. In this embodiment, steam-oil vapors flowing from still 1 through vapor line 5 flow directly through receiver 11, which has the light source 22 and phototube 14 arranged as in Fig. 2. The absorption of ultra-violet light by the vapors is measured with phototube 14 and is found to provide a satisfactory indication of the presence of crude oil in the vapors and a measure of the concentration of oil vapors in the vaporized material. In this embodiment, receiver 11 is provided with a jacket 25 through which a heating fluid may be circulated to prevent condensation within the receiver. In some cases, if condensation is desired in receiver 11, a suitable cooling fluid may be circulated through jacket 25.

Fig. 4 illustrates another embodiment of a still 1 in which a current of steam from a supply pipe 8a is directed against the surface of the mud fluid 23 passing through the still. This arrangement provides for a form of surface steam distillation which is found to produce satisfactory results in vaporizing crude oil present in the drilling fluid for the purposes of oil detection as herein described. This method results in substantial savings in steam, since only the surface of the body of mud fluid in the still is heated, and condensation of steam in heating the mass of mud fluid is avoided thereby.

Fig. 5 illustrates another embodiment of an apparatus by means of which ordinary visible or white light, instead of ultra-violet or other rays may be employed for detection of oil in the drilling fluid. In this embodiment the condensate flowing from condenser tube 9 enroute to receiver 11, passes through a chamber 27 in which is arranged a body of a suitable oil soluble dye 28, such as Sudan-3 for example, through which the condensate is constrained to flow. Any oil present in the condensate will be colored by the dye and will thus be made visible to the naked eye, and will thus indicate the presence of oil in the distillate. Such direct observation may be made by permitting condensate from the overflow 12 into a test tube.

If more exact quantitative measurements of the amount of oil present in the distillate is desired, the condensate is introduced into receiver 11, and overflows therefrom in the manner previously described. The light source, 26 in this case, may be an ordinary incandescent lamp 26 positioned below bottom 24 as in the arrangement shown in Fig. 2. Ordinary visible light is transmited from lamp 26 through the body of condensate to phototube 14 which is arranged to be sensitive to visible light. Phototube 14 is now employed to measure the quantity of the visible light which is absorbed in passing through the condensate. It is found that the quantity of the visible light which is absorbed is quantitatively related to the quantity of crude oil in the condensate, which is, in turn, quantitatively related to the concentration of the crude oil in the mud. In this case the dye body 28 may be omitted.

Still another method of detecting oil in the distillate comprises mixing with the condensate flowing from the condenser in condenser tube 9, a suitable normally non-fluorescent solvent for the oil. Such a solvent may be introduced into tube 9 through a branch pipe 30a (Fig. 1). The solvent selectively dissolves the oil droplets from the condensate and when introduced into receiver 11, the solution will stratify in a layer on the surface of the water in receiver 11. Irradiation of the solvent layer with ultra-violet light will cause the solution to fluoresce in the characteristic manner if any crude oil was present in the mud and was vaporized by the steam distillation.

Suitable solvents for this embodiment are the light liquid paraffin hydrocarbons boiling below about 350° F. These include the pentane-to-decane fractions ordinarily obtained from petroleum. Other solvents may be used provided they are normally non-fluorescent.

While the results described are most conveniently obtained by subjecting the mud to distillation with steam in the manner described, it will be understood that a vehicle other than steam may be employed. Furthermore, distillation may be accomplished by heating the still 1 in any suitable manner, but with water present in the still; the vapors may then be conducted to the receiver 11 to be inspected as in Figure 3 or condensed and inspected as in Figures 1 and 2, particularly if there is water or other suitable liquid in the receiver.

While in the illustrative embodiments rather complete apparatus has been shown, although schematic, it will be understood that, in many of its phases, the method is not dependent upon any particular apparatus, but may be performed by simple manual and visual operations. Thus, the condensate from tube 9 of Figure 1 may be conducted to the apparatus of the Hayward Patent 2,213,138, as shown in Figure 6, where it may be viewed directly by the means there described, namely, the container 200, the fluorescence-exciting lamp 40, the ordinary lamp 80 and the lens 60. The vapor from 5 of Figure 3 may also be conducted to the chamber 100 of such apparatus and similarly viewed. The lamp 40 may be one to throw diffused light, as by a frosted globe or ground glass screen; in such a case the oil will appear silvery or as an aura.

While in Figs. 1, 3 and 4, the still is one adapted to receive a drilling fluid, the method is one in which cuttings may be subjected to steam distillation, as in a flask as previously described. Thus a still like Fig. 4 may be employed in which the inlet 2 and outlet 3 are omitted together with the baffle 7 and in which the bottom part may be made removable from the dome 4 but attached thereto by a screw seal joint. The bottom part of the still may thus be supplied with cuttings from the ditch or screen, preferably after washing, and the bottom can then be replaced. That, of course, involves a batch process, but by directing steam on the cuttings through pipe 8a, at a temperature not in excess of 350° F., the crude oil will be vaporized, together with any water present, and analysis may proceed as before.

From the foregoing it will be seen that this invention provides a method and apparatus for detecting oil in well drilling fluid, whereby many of the complications and difficulties of methods heretofore used are avoided, and which is relatively simple and accurate in operation. It will also be seen that by subjecting drilling fluid to steam distillation, as described, the presence and concentration of crude oil therein may be readily determined by subjecting the vaporized material either in vaporous or condensed state, to inspection with a selected band from the spectrum.

The term "spectrum," as used herein, is intended to include only that portion of the entire electro-magnetic spectrum extending from about $3 \times 10^{-9}$ cm. to 0.02 cm. within which range are found the ultra-violet, visible, and infra-red bands.

It will be understood that various alterations and modifications may be made in the steps of the method and in the details of the apparatus herein disclosed, within the scope of the appended claims but without departing from the spirit of this invention.

What I claim and desire to secure by Letters Patent is:

1. The method of detecting the presence of minute and normally unobservable quantities of crude petroleum oil which has become dilutedly dispersed in a mud-laden drilling fluid, or contained in the cuttings thereof, during the course of drilling a well while the head of the fluid column exceeds that of an oil stratum being penetrated, comprising, subjecting such fluid or the cuttings, to distillation with steam at a temperature not in excess of 350° F. to thereby vaporize crude oil fractions and water from the drilling fluid or the cuttings, and testing the resulting vaporized material for the presence of crude oil fractions.

2. The method of detecting the presence of minute and normally unobservable quantities of crude petroleum oil which has become dilutely dispersed in a mud-laden drilling fluid, or contained in the cuttings thereof, during the course of drilling a well while the head of the fluid column exceeds that of an oil stratum being penetrated, comprising, subjecting such a fluid or the cuttings to distillation with steam at a temperature not in excess of 350° F. to vaporize crude oil fractions and water from the drilling fluid or the cuttings, and testing the resulting vaporized material in the vapor state for the presence of crude oil fractions.

3. The method of detecting the presence of minute and normally unobservable quantities of crude petroleum oil which has become dilutedly dispersed in a mud-laden drilling fluid, or contained in the cuttings thereof, during the course of drilling a well while the head of the fluid column exceeds that of an oil stratum being penetrated, comprising, subjecting such a fluid or the cuttings, to distillation with steam to thereby vaporize crude oil fractions and water from the drilling fluid or the cuttings, condensing the resulting vaporized material, and testing the condensate for the presence of crude oil fractions.

4. The method of detecting the presence of minute and normally unobservable quantities of crude petroleum oil which has become dilutedly dispersed in a mud-laden drilling fluid or contained in the cuttings thereof, during the course of drilling a well while the head of the fluid column exceeds that of an oil stratum being penetrated, comprising, subjecting such a fluid or the cuttings to distillation with steam at a temperature not in excess of 350° F. to thereby vaporize crude oil fractions and water from the drilling fluid or the cuttings, and inspecting the vaporized material with rays from a selected band of the spectrum to thereby detect the presence of crude oil fractions in the vaporized material.

5. The method of detecting the presence of minute and normally unobservable quantities of crude petroleum oil which has become dilutedly dispersed in a mud-laden drilling fluid or contained in the cuttings thereof, during the course of drilling a well while the head of the fluid column exceeds that of an oil stratum being penetrated, comprising, subjecting such a fluid or the cuttings to distillation with steam at a temperature not in excess of 350° F. to thereby vaporize crude oil fractions and water from the drilling fluid or the cuttings, admixing with the resulting vaporized material a normally non-fluorescent solvent for the crude oil fractions, and irradiating the resulting solution with fluorescence-exciting rays to thereby indicate the presence of crude oil fractions therein by the resulting fluorescence.

6. The method of detecting the presence of minute and normally unobservable quantities of crude petroleum oil which has become dilutedly dispersed in a mud-laden drilling fluid, or contained in the cuttings thereof, during the course of drilling a well while the head of the fluid column exceeds that of an oil stratum being penetrated, comprising, subjecting such a fluid or the cuttings, to distillation with steam at a temperature not in excess of 350° F. to thereby vaporize crude oil fractions and water from the drilling fluid or the cuttings, condensing the resulting vaporized material, and admixing with the resulting condensate an oil-soluble dye to indicate the presence of crude oil by the resulting coloration of the vaporized material.

7. The method of detecting the presence of minute and normally unobservable quantities of crude petroleum oil which has become dilutedly dispersed in a mud-laden drilling fluid or contained in the cuttings thereof, during the course of drilling a well while the head of the fluid column exceeds that of an oil stratum being penetrated, comprising, subjecting such a fluid or the cuttings, to distillation with saturated steam at substantially atmospheric pressure to thereby vaporize crude oil fractions and water from the drilling fluid or the cuttings, and testing the resulting vaporized material for the presence of crude oil fractions.

8. The method of detecting the presence of minute and normally unobservable quantities of crude petroleum oil which has become dilutely dispersed in a mud-laden drilling fluid or contained in the cuttings thereof, during the course of drilling a well while the head of the fluid column exceeds that of an oil stratum being penetrated, comprising. subjecting such a fluid or the cuttings to distillation with steam at a temperature not in excess of 350° F. to thereby vaporize crude oil fractions and water from the drilling fluid or the cuttings, and inspecting the resulting vaporized material with ultra-violet rays to thereby detect the presence of crude oil fractions in the vaporized material.

9. The method of detecting the presence of minute and normally unobservable quantities of crude petroleum oil which has become dilutedly dispersed in a mud-laden drilling fluid or contained in the cuttings thereof, during the course of drilling a well while the head of the fluid column exceeds that of an oil stratum being penetrated, comprising, subjecting such a fluid or the cuttings to distillation with steam at a temperature not in excess of 350° F. to thereby vaporize crude oil fractions and water from the drilling fluid or the cuttings, condensing the vaporized material, irradiating the resulting condensate with ultra-violet rays and observing the resulting fluorescence of said condensate as an indication of the presence therein of said crude oil fractions.

10. The method of detecting the presence of minute and normally unobservable quantities of crude petroleum oil which has become dilutedly dispersed in a mud-laden drilling fluid or contained in the cuttings thereof, during the course of drilling a well while the head of the fluid column exceeds that of an oil stratum being penetrated, comprising, subjecting such a fluid or the cuttings to distillation with steam at a temperature not in excess of 350° F. to thereby vaporize crude oil fractions and water from the drilling fluid or the cuttings, irradiating the resulting vaporized material with rays from a selected band of the spectrum, and observing the resulting changes in energy of said rays produced by the vaporized material as an indication of the presence of crude oil fractions in the fluid.

11. The method of detecting the presence of minute and normally unobservable quantities of crude petroleum oil which has become dilutedly dispersed in a mud-laden drilling fluid or contained in the cuttings thereof, during the course of drilling a well while the head of the fluid column exceeds that of an oil stratum being penetrated, comprising, subjecting such a fluid or the cuttings to distillation with steam at a temperature not in excess of 350° F. to thereby vaporize crude oil fractions and water from the drilling fluid or the cuttings, irradiating the resulting vaporized material with rays from a selected band of the spectrum, and measuring the resulting changes in energy of said rays produced by said vaporized material as an index of the presence and concentration of said crude oil fractions in the fluid.

12. The method of detecting the presence of minute and normally unobservable quantities of crude petroleum oil which has become dilutedly dispersed in a mud-laden drilling fluid or contained in the cuttings thereof, during the course of drilling a well while the head of the fluid column exceeds that of an oil stratum being penetrated, comprising, passing a current of steam at a temperature not in excess of 350° F. into contact with the surface of such a fluid or the cuttings to thereby vaporize crude oil fractions and water from the surface of the drilling fluid or the cuttings, and testing the resulting vaporized materials for the presence of crude oil fractions.

13. The method of detecting the presence of minute and normally unobservable quantities of crude petroleum oil which has become dilutedly dispersed in a mud-laden drilling fluid or contained in the cuttings thereof, during the course of drilling a well while the head of the fluid column exceeds that of an oil stratum being penetrated, comprising, subjecting a flowing stream of such a fluid or the cuttings thereof to distillation with steam at a temperature not in excess of 350° F. to thereby vaporize crude oil fractions and water from successive increments of the drilling fluid stream or the cuttings, testing the resulting vaporized material for the presence of crude oil fractions, and measuring the relative concentration of crude oil fractions in the portion of the vaporized material from said successive increments of the fluid or cuttings as an index of the relative concentration of crude oil in said successive increments.

14. The method of detecting the presence of minute and normally unobservable quantities of crude petroleum oil which has become dilutedly dispersed in a mud-laden drilling fluid or contained in the cuttings thereof, during the course of drilling a well while the head of the fluid column exceeds that of an oil stratum being penetrated, comprising, subjecting a flowing stream of such a fluid or the cuttings thereof to distillation with steam at a temperature not in excess of 350° F. to thereby vaporize crude oil fractions and water from successive increments of the drilling fluid stream or the cuttings, continuously condensing the resulting vaporized mixture, and continuously measuring the changing concentration of crude oil fractions in the resulting condensate as an index of the changing concentration of crude oil in the fluid stream or in the cuttings.

15. The method of detecting the presence of minute and normally unobservable quantities of crude petroleum oil which has become dilutedly dispersed in a mud-laden drilling fluid or contained in the cuttings thereof, during the course of drilling a well while the head of the fluid column exceeds that of an oil stratum being penetrated, comprising, subjecting such a fluid or the cuttings to distillation at a temperature not in excess of 350° F., permitting the resultant vapor to condense, and testing the condensate or the presence of crude oil fractions.

16. The method of detecting the presence of minute and normally unobservable quantities of crude petroleum oil which has become dilutedly dispersed in a mud-laden drilling fluid or contained in the cuttings thereof, during the course of drilling a well while the head of the fluid column exceeds that of an oil stratum being penetrated, comprising, subjecting such a fluid or the cuttings to distillation at a temperature not in excess of 350° F., permitting the resultant vapor to condense, and subjecting the condensate to a selective visual inspection for the presence of crude oil fractions.

17. An apparatus for detecting the presence of minute and normally unobservable quantities of crude petroleum oil which has become dilutedly dispersed in a mud-laden drilling fluid, or contained in the cuttings thereof, during the course of drilling a well while the head of the fluid column exceeds that of an oil stratum being penetrated, comprising, means for receiving and subjecting such a fluid or the cuttings, to distillation, at a temperature not in excess of 350° F., means for condensing the resultant vapors, and means for subjecting the condensate to selective visual inspection for the presence of crude oil fractions.

18. An apparatus for detecting the presence of minute and normally unobservable quantities of crude petroleum oil which has become dilutedly dispersed in a mud-laden drilling fluid or contained in the cuttings thereof, during the course of drilling a well while the head of the fluid column exceeds that of an oil stratum being penetrated, comprising, means for receiving and subjecting such a fluid or the cuttings to distillation at a temperature not in excess of 350° F., means for condensing the resultant vapors, means for subjecting the condensate to selective visual inspection for the persence of crude oil fractions, and means for testing for any residual gas.

ROBERT E. SOUTHER, Jr.

REFERENCES CITED

The following references are of record in the file of this patent:

UNITED STATES PATENTS

| Number | Name | Date |
| --- | --- | --- |
| 1,376,631 | Newton et al. | May 3, 1921 |
| 1,562,550 | Hall | Nov. 24, 1925 |
| 1,676,675 | Trumble | July 10, 1928 |
| 1,789,339 | Lewis | Jan. 20, 1931 |
| 2,086,180 | Bonotto | July 6, 1937 |
| 2,086,808 | Kallam | July 13, 1937 |
| 2,096,099 | Gaugler | Oct. 19, 1937 |
| 2,124,879 | Hickman | July 26, 1938 |
| 2,206,922 | Smith | July 9, 1940 |
| 2,213,138 | Hayward | Aug. 27, 1940 |
| 2,221,169 | Raney et al. | Nov. 12, 1940 |
| 2,227,438 | Campbell | Jan. 7, 1941 |
| 2,229,884 | Cahlkley | Jan. 28, 1941 |
| 2,263,108 | Stuart | Nov. 18, 1941 |
| 2,324,085 | Horvitz | July 13, 1943 |